United States Patent [19]
Johnson et al.

[11]  4,344,710
[45]  Aug. 17, 1982

[54] POLYMER FOAM EXTRUSION SYSTEM

[75] Inventors: D. Emil Johnson, Canandaigua; Charles M. Krutchen, Pittsford; G. Vincent Sharps, Jr., Fairport, all of N.Y.

[73] Assignee: Mobil Oil Corporation, New York, N.Y.

[21] Appl. No.: 205,353

[22] Filed: Nov. 10, 1980

Related U.S. Application Data

[63] Continuation-in-part of Ser. No. 158,187, Jun. 10, 1980, abandoned.

[51] Int. Cl.³ .......................... B29B 3/00; B29B 5/02; B29B 1/06
[52] U.S. Cl. ....................................... 366/76; 366/89; 264/53
[58] Field of Search ....................... 366/76, 77, 75, 79, 366/87, 89, 88, 144; 264/50, 53; 425/207, 208

[56] References Cited

U.S. PATENT DOCUMENTS

| | | | |
|---|---|---|---|
| 3,344,215 | 9/1967 | De Witz et al. | 264/53 |
| 3,444,283 | 5/1969 | Carlson | 264/53 |
| 3,482,006 | 2/1969 | Carlson | 264/54 |
| 3,658,973 | 4/1972 | Aykanian | 264/53 |
| 3,793,416 | 2/1974 | Finkmann et al. | 264/53 |
| 3,985,348 | 10/1976 | Skidmore | 366/76 |
| 4,054,271 | 10/1977 | Lanzillo | 366/76 |
| 4,124,336 | 11/1978 | Johnson | 425/4 |

Primary Examiner—Robert W. Jenkins
Attorney, Agent, or Firm—C. A. Huggett; M. G. Gilman; J. P. O'Sullivan, Sr.

[57] ABSTRACT

A continuous foam production system is disclosed wherein a molten thermoplastic resin is mixed with volatile blowing agent at elevated pressure to form an extrusion mass. A helical screw extruder means is adapted to extrude the molten resin with volatile blowing agent into a low pressure foaming zone to form a foam sheet, tube or other shape. An improved fluid handling system includes storage means for holding at least one of a plurality of disparate volatile liquids under pressure sufficient to maintain a normally gaseous blowing agent in liquified state and cooling means for receiving a pressurized first stream of liquified thermally-gaseous blowing agent and cooling below its autogenous temperature. A pump operatively connected between the cooling means and extruder means increases pressure of the first stream higher than the elevated pressure of the extruder, where it may be combined with a pressurized stream of second liquid blowing agent. Flow control means is provided for injecting a predetermined amount of disparate liquid blowing agents from the first and second streams into the extruder means at elevated pressure to form an extrusion mass.

5 Claims, 2 Drawing Figures

POLYMER FOAM EXTRUSION SYSTEM

REFERENCE TO COPENDING APPLICATION

This application is a continuation-in-part of U.S. Patent Application Ser. No. 158,187, filed June 10, 1980 for Polystyrene Foam Extrusion Method, now abandoned.

BACKGROUND OF THE INVENTION

This invention relates to thermoplastic foam production and a novel system for direct injection of volatile liquid blowing agent into a screw-type extruder. In particular, it relates to an apparatus for handling fluids and improvements in multi-component blowing agent injection.

In the manufacture of polystyrene foam sheet, rod, or other stock materials, significant advantages have been obtained in the use of systems for mixing molten resin with various normally gaseous or volatile liquid components under high pressure. Extrusion of the molten mixture into a low pressure zone results in foaming of the thermoplastic extrusion mass by vaporization of the volatile or gaseous components.

A variety of normally gaseous or liquid blowing agents have been proposed for olefinic or styrenic polymers, including virtually all of the common atmospheric gases and lower hydrocarbons. For polystyrene, the $C_4$–$C_6$ alkanes have gained widespread acceptance, especially pentanes. Following a typical extrusion foaming step, the stock material is ordinarily aged before thermoforming into containers or the like. During aging the foam cells and polymeric matrix become partially depleted of volatile hydrocarbons, which enter the atmosphere, generally as non-toxic, odorless materials. However, potential atmospheric contamination by these by-products of foam manufacture has led workers to seek non-polluting alternative blowing agents, such as the usual atmospheric gases, e.g., nitrogen, carbon dioxide, etc.

Extreme volatility of most of these normally gaseous materials, however, has posed a considerable problem in controlling the foaming process, resulting in surface defects and/or corrugations in the sheet product. Despite numerous attempts to solve this problem, $CO_2$ has not been successfully employed in continuous direct injection foam manufacturing. In order to overcome these problems, a system has been devised for injecting a mixture of alkane liquid and carbon dioxide liquid into a molten extrusion mass in a continuous extruder unit.

SUMMARY OF THE INVENTION

A new system is provided for fluid handling especially adapted for injection of mixed alkane-$CO_2$ blowing agents in styrenic or other thermoplastic polymers.

The novel system comprises extruder means for transporting resin under pressure from a feed point to a discharge point through a heating zone, fluid injection zone and mixing zone. A conventional resin supply means is provided for introducing resin to the extruder at the feed point for melting in the heating zone. An improved fluid handling means has been devised for pumping a plurality of diverse volatile liquids from liquid source to the fluid injection zone of the extruder means. At least one of the volatile liquids, such as $CO_2$, is supplied as a cooled pressurized, normally-gaseous liquified material. Operatively connected with the fluid handling means is a flow metering means for supplying predetermine amounts of the diverse volatile liquids.

In a preferred embodiment, storage means is provided for maintaining the normally-gaseous $CO_2$ material under pressure; and heat exchange means operatively connected between the storage means and the liquid handling means is provided for cooling the normally-gaseous material to prevent flashing thereof during pumping.

DESCRIPTION OF PREFERRED EMBODIMENTS

Figure 1:
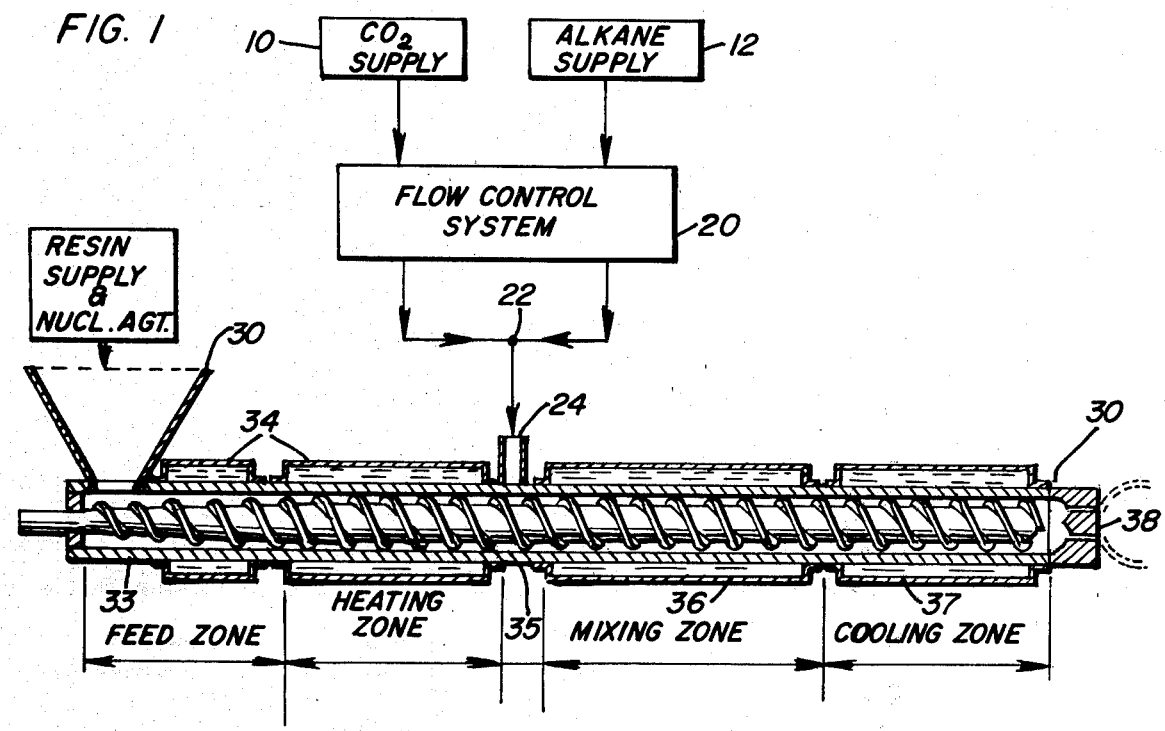
FIG. 1 is a cross sectional view of a direct injection thermoplastic foam extrusion system showing an embodiment of the present invention.

In the following description, metric units and parts by weight are employed unless otherwise indicated. Referring to FIG. 1, a typical direct injection thermoplastic foam extrusion system is shown, including the novel multi-liquid fluid supply handling system. From a first supply source 10, liquid carbon dioxide is taken under pressure along with a liquid alkane from a second supply source 12 to a flow control system 20 having means for supplying a predetermined amount of the diverse volatile liquids to a conduit mixing tee 22 and thereafter to the fluid injection inlet 24 of screw-type extruder 30. Suitable extrusion equipment is commercially available, or may be constructed as shown in U.S. Pat. No. 3,482,006, for instance. The extruder may be integrally-housed with multiple zones for temperature control and material handling. The extruder may be segmented advantageously, with a first section for heating and plasticizing the resinous feed prior to blowing agent injection and an additional tandem section for mixing, cooling and discharging the extrusion mass.

Hopper 32 provides means for supplying solid thermoplastic resin, optionally with a nucleating agent, to the extruder 30 at the feed point 33. Heating jackets 34 provide the heat to the resin as it passes through a heating zone toward a fluid injection zone 35, where the liquid blowing agent is introduced to the molten resin at elevated pressure, dissolving therein as it passes through a temperature-controlled mixing zone 36 and a cooling zone to an extrusion orifice 38, which may be a slit ring, sheeting die, etc.

While it is advantageous to join the mixed blowing agents in conduit means 22 prior to injection into the extruder, it is understood that separate injection inlets can be employed if desired. It is believed that by joining a first normally gaseous liquid stream of carbon dioxide and a second normally liquid stream of alkane prior to pumping the combined streams into the injection zone, that co-dissolution of these liquids may be enhanced.

It is generally known that $C_4$ to $C_6$ alkanes have a plasticizing effect on molten polystyrene and related resins. Especially in the mixing section, a significant reduction of energy for operating the extrusion screw is observed for mixed blowing agent systems employing carbon dioxide to replace a portion of alkane. This is unexpected in view of the reduction of a known plasticizer component, which would ordinarily be expected to increase viscosity of the extrusion mass.

Figure 2:
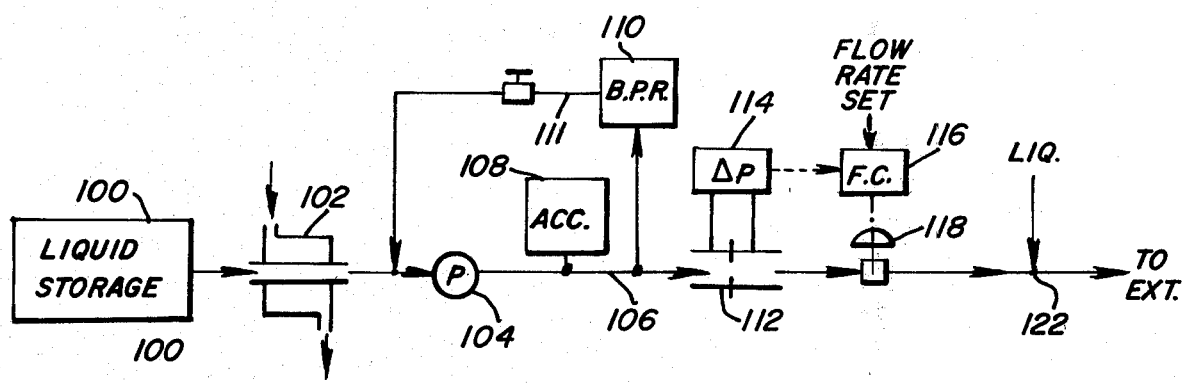
FIG. 2 is a schematic drawing of a fluid handling sub-system for use with the present invention.

Referring to FIG. 2, a typical fluid handling subsystem is shown schematically. From a storage unit 100, where a blowing agent is maintained under pressure greater than the autogenous (saturation) pressure of the material, the liquid is passed through heat exchange means 102 where it is supercooled by at least about 10° C., in the case of $CO_2$. As liquid is drawn into pump 104, this supercooling avoids flashing of the liquid and prevents vapor lock on the suction side of the pump, which may be a standard piston displacement type, e.g., such as a jacketed, chilled LUWA pump. Typically, the pump increases fluid pressure from 50-75 atmospheres in the storage unit to about 250-350 atmospheres between the pump and injection zone. Pressure surges in high pressure line 106 are moderated by an accumulator 108, which contains a compressible gas pocket to absorb liquid pressure. A back pressure regulator 110 in bypass line 111 bleeds a portion of the liquid around pump 104 to control downstream pressure in conduit 106. A flow measurement means, comprising an orifice plate 112 and differential pressure transducer 114, generates a signal representative of the liquid flow rate in conduit 106 and transmits the signal, which may be electrical, peumatic or hydraulic, to a flow controller 116. A desired flow rate for the controller may be set manually or by remote control means to establish a fixed or variable set point for the flow controller 116, which operates a control valve 118 in response to the set point and flow measurement signals. The flow rate may be set by a ratio controller, programmed input, etc.

The fluid handling and flow control subsystem of FIG. 2 may be duplicated for each of the plurality of injected liquids; however, cooling stored liquid may not be required between storage and pump for the alkanes. A suitabe conduit mixer, such as tee element 122, can be used for in-line blending of the liquid streams before passing the combined liquids to the extruder.

Optimum foam product can be achieved by making minor changes in the alkane:$CO_2$ feed ratio, usually in the range of 3:1 to 1:1 weight ratio. For general purpose linear styrene homopolymer, an optimum value of about 2:1 has been found; however, for any particular extrusion system and combination of blowing agents a desirable blend can be determined empirically by examining the product density, surface variations, etc.

An important function of the system is its start-up sequence. It is well known to operate alkane-blown extrusion units, and starting these can be achieved without undue problems or excessive product loss. Start-up with even a minor amount of carbon dioxide in the blowing agent may prove troublesome, and a technique has been found for operating the unit successfully during this phase of operations. First the thermoplastic resin is fed through the heating zone, along with an effective amount of nucleating agent, as described in U.S. Pat. No. 3,444,283 (Carlson), incorporated herein by reference. The initial blowing agent stream is $C_4$ to $C_6$ alkane, preferably 100% pentane or isopentane, at a feed rate equivalent to 5% by weight of the resin. This results in a highly plasticized extrusion mass which is easily handled. After reaching steady state condition for the condinuous extrusion process, $CO_2$ is gradually bled into the blowing agent stream, increasing from 0 to about $\frac{1}{4}$ to $\frac{1}{3}$ of the total blowing agent while a proportionate decrease in alkane is effected. This change-over can be achieved by manual control of two independently operated flow measurement and control subsystems, or an automatically programmed flow ratio control system can link plural flow lines. It is understood that two or more liquids may be blended in this manner to obtain optimum product quality.

A styrenic polymer foam extrusion system can be operated with a variety of blowing agents within the inventive concept. Lower alkanes, $CO_2$ and numerous other volatile materials are generally soluble in the hot molten thermoplastic resin under operating pressure (e.g., 2000 to 3000 psig). The $C_4$ to $C_6$ alkanes, including n-butane, isobutane, n-pentane, isopentane, n-hexane, etc., are sufficiently volatile to form gas cells during the foaming step. They are also unhindered with respect to resin permeability, permitting exchange of these volatile components with air during aging. The $C_4$ to $C_6$ alkanes may be employed alone or in mixtures thereof, although pentane and/or isopentane are preferred.

The thermoplastic resins of various types may be employed for making foam articles, especially amorphous linear addition polymers of ethylenically-unsaturated monomers, such as styrene, p-methyl styrene, ethylene or other alpha-olefins, acrylics, etc. The preferred materials are styrenic homopolymers or interpolymers containing a predominate amount of styrene or substituted styrene. Commercially available polystyrene, such as Dow 685, or similar general purpose resins manufactured by Mobile Chemical Company and Foster Grant, can be employed in the system.

As an example of a continuously operated system according to this invention, carbon dioxide stored at room temperature (20° C.) is forced out of its storage container by its autogenous (saturation) pressure (about 58 atmospheres) through a refrigerated heat exchange wherein it is cooled to about 0° C. to 5° C. Maintaining the pressure while cooling assures that the carbon dioxide leaving the heat exchanger is in a supercooled liquid state, i.e., below its autogenous temperature. From the heat exchanger this first stream is fed to a pump which increases the pressure on the liquid carbon dioxide to an elevated injection pressure of about 340 atmospheres. At this pressure, liquid carbon dioxide may be injected utilizing the fluid handling and flow control system of FIG. 2 with a precisely controlled flow into the extrusion system. Throughout the system which handles the liquid carbon dioxide, care must be taken to ensure that the pressure within the system does not drop below about 5 atmospheres to avoid solidification of the carbon dioxide and subsequent plugging of the injection lines.

Polystyrene foam is produced in accordance with the direct injection extrusion system, with a 3.6 parts by weight of isopentane and 1.8 parts of $CO_2$ per 100 parts by weight of polystyrene resin. Polystyrene resin pellets having a melt index of about 4.5 are fed to the feed hopper of a commercially available tandem helical screw extruder. The heating section has a length to diameter ratio of 32:1. As the polystyrene resin pellets are being fed into the feed hopper of the extruder, a mixture of sodium bicarbonate and citric acid nucleating agents in powdered form are admixed with the resin pellets. The mixture constitutes 0.3 parts by weight per 100 parts of polystyrene resin feed. The ratio of sodium bicarbonate to citric acid is 1.3:1. The feed mixture is urged forward by the helical screw within the barrel of the extruders as it is mixed, compressed, heated to about 235° C., and converted to a molten form prior to reaching the injection zone for addition of the blowing agent mixture. Approximately 5.4 weight percent of the mixture of liquid carbon dioxide and isopentane is injected at about 210 atmospheres and 15° C. through the barrel of the extruder into the molten resin. Following fluid injection, blowing agent mixture and the polystyrene resin-nucleating agent mixture are continuously mixed in a primary extruder and subsequently passed through a hallow adaptor section into a seondary cooled tandem extruder. The secondary extruder screw has a length to diameter ratio of about 30:1 screw diameter. The molten mixture is passed along the length of the cooled extruder, where additional mixing takes place, and is expressed through a suitable die affixed to the discharge end of the secondary extruder. The temperature of the foam as it is extruded in the form of a hollow tube from the tubular die orifice is about 150° C.

The extruded product containing $CO_2$ and alkane has sufficient strength to be taken to a thermoformer and thermoformed directly into parts without aging. Due to the degree of plasticization, fresh 100% pentane blown sheet does not have sufficient hot strength to support its weight when heated to thermoforming conditions.

Injection rates for alkanes, and $CO_2$ respectively, may vary from about 2 to 5 parts and 0.5 to 5 parts per 100 parts by weight of thermoplastic resin. It is preferred to maintain these disparate liquids in a closely controlled weight ratio from about 3:1 to 1:1 pentane:$CO_2$, with about 2:1 being optimum for the system described above. It is understood that other non-deleterious blowing agents or other additives may be incorporated into the extrusion mass. Dyer, pigments, stabilizers and antioxidants may be employed, as known to the skilled worker.

We claim:

1. A system for producing foamable thermoplastic resin mixture comprising:
   extruder means for transporting resin under pressure from a feed point to a discharge point through a heating zone, fluid injection zone and mixing zone;
   resin supply means for introducing resin to the extruder means at the feed point for melting in the heating zone;
   storage means for maintaining a plurality of diverse volatile liquids under the autogeneous pressure of the material, at least one of said volatile liquids being normally gaseous;
   fluid handling means for pressurizing said iquids from said storage means to the fluid injection zone of the extruder means;
   heat exchange means operatively connected between said storage means and said fluid handling means for cooling the normally-gaseous material to prevent flashing thereof during pumping; and
   flow metering means operatively connected with the fluid handling means for supplying predetermined amounts of the diverse volatile liquids.

2. The system of claim 1 wherein the fluid handling means includes conduit means for joining a first normaly gaseous liquid stream and a second normally liquid stream prior to pumping the combined streams into the injection zone.

3. The system of claim 1 including means for controlling first and second streams of disparate liquid blowing agents in predetermined ratio.

4. The system of claim 3 wherein said ratio control means comprises means for blending from a single less-volatile blowing agent stream to a fixed ratio with a higher volatility liquid stream during start-up.

5. In a continuous foam production system wherein a molten thermoplastic resin is mixed with volatile blowing agent at elevated pressure to form an extrusion mass and wherein a helical screw extruder means is adapted to extrude the molten resin with volatile blowing agent into a low pressure foaming zone; the improvement which comprises:
   storage means for holding at least one of a plurality of disparate volatile liquids under pressure sufficient to maintain a normally gaseous blowing agent in liquified state;
   cooling means for receiving a pressurized first stream of liquified thermally-gaseous blowing agent and cooling said first stream below autogenous temperature;
   pump means operatively connected between the cooling means and extruder means for increasing pressure of the first stream higher than the elevated pressure of the extruder means;
   a pressurized stream of second liquid blowing agent; and
   flow control means for injecting a predetermined amount of disparate liquid blowing agents from the first and second streams into the extruder means at elevated pressure to form an extrusion mass.

* * * * *